(12) United States Patent
O'Connor

(10) Patent No.: US 9,415,826 B2
(45) Date of Patent: Aug. 16, 2016

(54) BICYCLE HEAD TUBE SPACER

(71) Applicant: INDUSTRIES RAD INC., Saint-Georges-de-Beauce (CA)

(72) Inventor: D'Arcy O'Connor, Burnaby (CA)

(73) Assignee: INDUSTRIES RAD INC., St-Georges-de-Beauce (CA)

(*) Notice: Subject to any disclaimer, the term of this patent is extended or adjusted under 35 U.S.C. 154(b) by 0 days.

(21) Appl. No.: 14/680,580

(22) Filed: Apr. 7, 2015

(65) Prior Publication Data

US 2015/0284045 A1 Oct. 8, 2015

Related U.S. Application Data

(60) Provisional application No. 61/976,165, filed on Apr. 7, 2014.

(51) Int. Cl.
*B62K 21/02* (2006.01)
*B62K 21/20* (2006.01)

(52) U.S. Cl.
CPC ........... *B62K 21/20* (2013.01); *Y10T 29/49716* (2015.01)

(58) Field of Classification Search
CPC ......... B62K 21/04; B62K 21/20; B62K 21/02
See application file for complete search history.

(56) References Cited

U.S. PATENT DOCUMENTS

| | | | | |
|---|---|---|---|---|
| 697,435 | A * | 4/1902 | Berglund | B62K 21/04 280/280 |
| 2,160,035 | A * | 5/1939 | Schwinn | B62K 21/02 280/279 |
| 3,984,119 | A * | 10/1976 | Okazima | B60G 15/065 267/177 |
| 5,544,905 | A | 8/1996 | Chen | |
| 5,800,071 | A | 9/1998 | Chi | |
| 5,893,574 | A | 4/1999 | Campagnolo | |
| 5,918,895 | A | 7/1999 | Chi | |
| 5,954,355 | A * | 9/1999 | Hsu | B62K 21/02 280/276 |
| 5,979,925 | A | 11/1999 | Lin | |
| 6,019,017 | A | 2/2000 | Lin | |
| 6,126,323 | A * | 10/2000 | Tange | B62K 21/06 280/279 |
| 2003/0193161 | A1* | 10/2003 | Turner | B62K 21/02 280/276 |
| 2008/0129009 | A1* | 6/2008 | Czysz | B62K 21/06 280/275 |
| 2008/0303240 | A1* | 12/2008 | Lewis | B62K 19/16 280/276 |
| 2009/0072459 | A1* | 3/2009 | Tsai | F16F 9/366 267/216 |
| 2010/0327553 | A1* | 12/2010 | Talavasek | B62K 25/286 280/284 |
| 2013/0119632 | A1* | 5/2013 | Liao | B62K 21/20 280/276 |
| 2013/0187357 | A1* | 7/2013 | Moechnig | B62K 19/30 280/276 |
| 2014/0145413 | A1* | 5/2014 | Baltaxe | B62K 25/08 280/279 |

OTHER PUBLICATIONS

Saris Mercanti, Specialized 650B Evo StumpJumper Photographed & Weighed, Geometry Chart, PLus Q&A!, http://www.bikerumor.com/, Apr. 3, 2014.

* cited by examiner

*Primary Examiner* — Kevin Hurley
*Assistant Examiner* — Gabriela C Craciun
(74) *Attorney, Agent, or Firm* — Norton Rose Fulbright Canada LLP

(57) ABSTRACT

A spacer for positioning between a head tube of a bicycle frame and a front wheel fork of the bicycle. The spacer includes an annular body defines a center axis and extends axially between annular upper and lower spacer surfaces. A bore extends axially through the body concentrically with the center axis between a first opening in the annular upper spacer surface and a second opening in the annular lower spacer surface. The annular upper spacer surface includes a radially outer planar rim and an engagement flange disposed radially inwardly from the planar rim, the engagement flange projecting axially upwardly from the planar rim and circumscribing the opening. The planar rim and the engagement flange abut complementary surfaces on a lower mating surface of the head tube and form a seal with the head tube upon being engaged therewith.

22 Claims, 5 Drawing Sheets

FIG_2

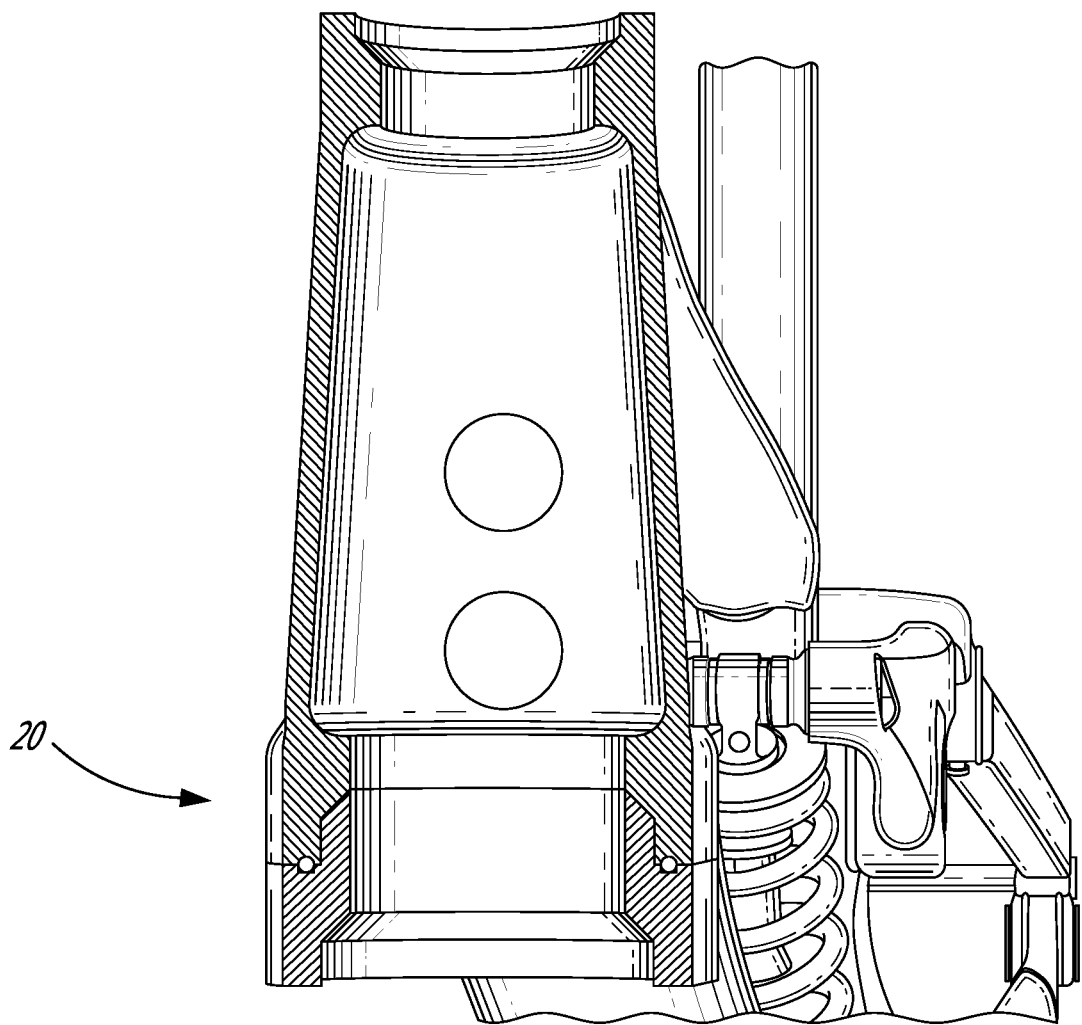
FIG_5

BICYCLE HEAD TUBE SPACER

CROSS-REFERENCE TO RELATED APPLICATIONS

This application claims priority on U.S. Provisional Patent Application No. 61/976,165 filed on Apr. 7, 2014, the entire content of which is incorporated herein by reference.

TECHNICAL FIELD

The application relates generally to bicycles and, more particularly, to front wheel assemblies of bicycles.

BACKGROUND

Many modern bicycles have suspension systems mounted to the bicycle frame to absorb shocks. Often, front wheel suspension systems include a front wheel suspension fork which is mounted at one of its ends to the front wheel, and at its other end to the bicycle frame.

In many bicycles, the front wheel suspension fork is designed for a wheel having a specific diameter, and cannot be easily adapted to be used with a wheel having a different diameter. For example, most currently used mountain bicycles have wheels of a standard diameter of 26 in. or 27 in. The front wheel suspension forks designed for a 26 in. front wheel cannot generally be used with a 27 in. front wheel, and vice versa, because this may negatively affect performance aspects of the bicycle, such as the intended frame geometry, the rider's relative position on the bicycle, and/or suspension travel or performance.

SUMMARY

In one aspect, there is provided a spacer for positioning between a head tube of a frame of a bicycle and a front wheel fork of the bicycle, the spacer comprising an annular body defining a center axis and extending axially between an annular upper spacer surface and an annular lower spacer surface, the body having a bore extending axially therethrough concentrically with the center axis between a first opening in the annular upper spacer surface and a second opening in the annular lower spacer surface, the annular upper spacer surface including a radially outer planar rim and an engagement flange disposed radially inwardly from the planar rim, the engagement flange projecting axially upwardly from the planar rim and circumscribing the opening, the planar rim and the engagement flange abutting complementary surfaces on a lower mating surface of the head tube and forming a seal with the head tube upon being engaged therewith.

In another aspect, there is provided a front wheel kit for a bicycle, comprising: a fork for a front wheel of the bicycle having two fork members adapted to receive an axle of the front wheel mounted to lower ends of the fork members, and upper ends of the fork members being attached to a central stem which is adapted to mate with a head tube of the bicycle; and a spacer for positioning between the head tube and the fork, the spacer having an annular body defining a center axis and extending axially between an annular upper spacer surface and an annular lower spacer surface, the body having a bore extending axially therethrough concentrically with the center axis between a first opening in the annular upper spacer surface and a second opening in the annular lower spacer surface, the annular upper spacer surface including a radially outer planar rim and an engagement flange disposed radially inwardly from the planar rim, the engagement flange projecting axially upwardly from the planar rim and circumscribing the opening, the planar rim and the engagement flange adapted to abut complementary surfaces on a lower mating surface of the head tube and forming a seal with the head tube upon being engaged therewith, the lower spacer surface of the spacer abutting a mating surface of the fork and the bore of the spacer receiving the central stem of the fork therein.

In another aspect, there is provided a bicycle frame set including at least a main frame and a front wheel kit as defined above.

In yet a further aspect, there is further provided a method of adapting a bicycle frame for a different size front wheel by extending a length of a head tube of the bicycle frame mounted to a suspension fork, the method comprising: providing a spacer having a body extending between an upper spacer surface and a lower spacer surface; mating the upper spacer surface with a correspondingly contoured lower mating surface of the head tube to define a non-planar interface, and forming an annular seal between the upper spacer surface and the lower mating surface at said non-planar interface; and mating the lower spacer surface with a correspondingly contoured component of the suspension fork, thereby placing the spacer between the head tube and the suspension fork and extending the length of the head tube.

BRIEF DESCRIPTION OF THE DRAWINGS

Reference is now made to the accompanying figures in which:

FIG. 5 is a detailed view of the spacer and head tube as shown in FIG. 3.

DETAILED DESCRIPTION

Figure 1:
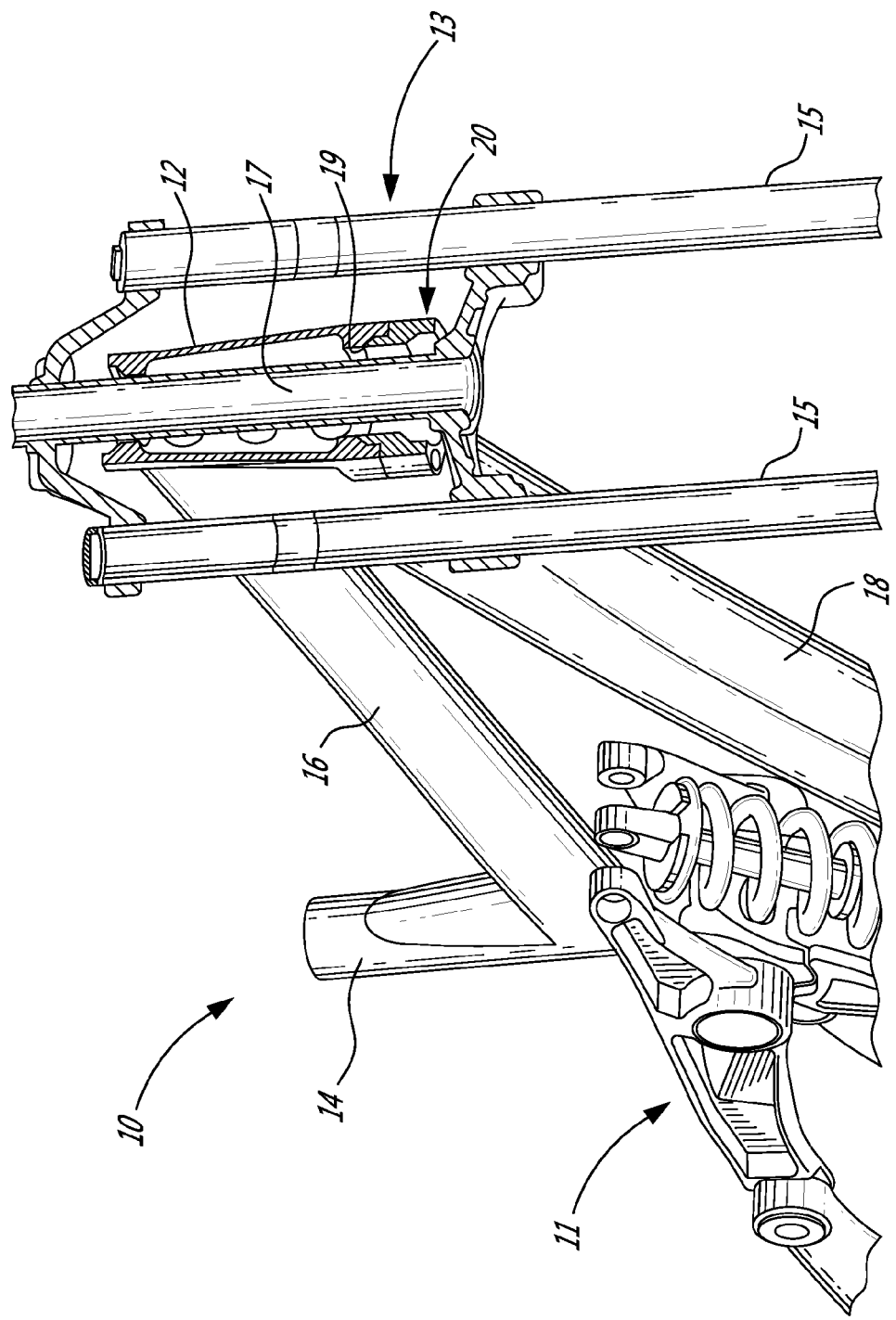
FIG. 1 is a perspective view of a bicycle having a spacer positioned between a head tube of a frame of the bicycle and a front wheel suspension fork, the head tube, spacer, and suspension fork being shown in cross-section, according to an embodiment of the present disclosure.

FIG. 1 illustrates generally a bicycle, such as a mountain bicycle, having a bicycle frame 10 (or simply "frame 10"). The frame 10 can be any suitable structure used to support a rider and includes at least a head tube 12. The frame 10 may also generally include a seat tube 14, a top tube 16, and a down tube 18 having a bottom bracket. The frame 10 can also have one or more suspension systems for absorbing the shocks experienced by the rider when the front and rear wheels impact objects on the riding surface. In the embodiment shown in FIG. 1, this suspension system includes a rear wheel suspension system 11 and a front wheel suspension fork 13, although only one of these may be used for a given bicycle.

The front wheel suspension fork 13 (or simply "suspension fork 13") can include two fork members 15 which attach at their lower ends to the front wheel axle on opposite sides of the front wheel. The fork members 15 each generally contain telescoping pistons or other damping elements (e.g. elastomers, etc.) which can attenuate the vertical displacement of the fork members 15, and thus the front wheel. The upper ends of the fork members are connected to the head tube 12 via a central stem member 17. As the front wheel is vertically displaced, by hitting a bump in the riding surface, the telescoping pistons of the fork members 15 are displaced upwardly and their vertical movement is hydraulically or pneumatically attenuated, thereby reducing the shock experienced by the rider. In a typical bicycle, the central stem member 17 can be mounted to a lower mating surface 19 of the head tube 12, typically by a bearing or sealing member.

Figure 2:
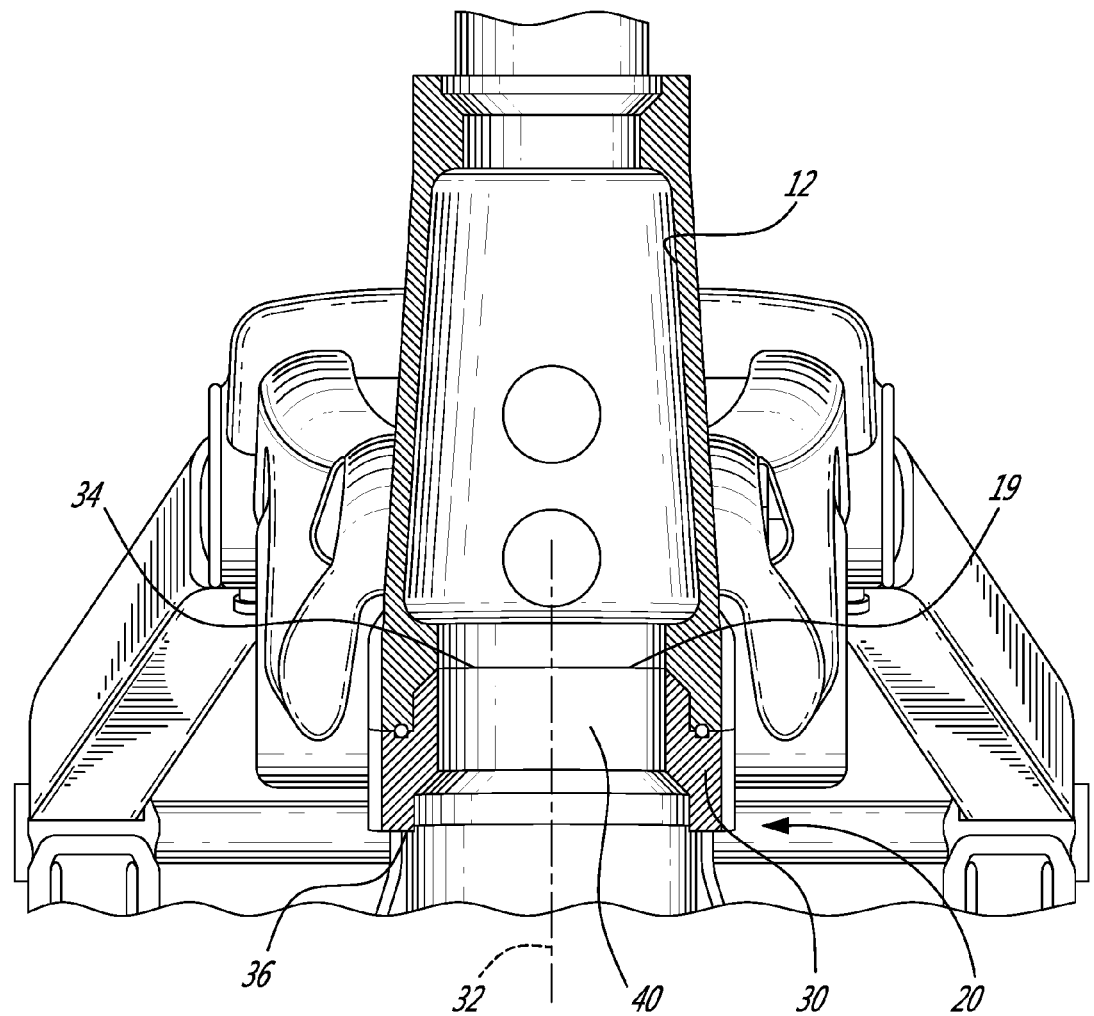
FIG. 2 is a front view of the spacer and head tube of FIG. 1.

Referring to FIG. 2, a spacer 20 can be positioned between the lower mating surface 19 of the head tube 12 and the suspension fork 13, typically its central stem member 17. In so doing, the spacer 20 allows for a frame 10 initially designed to be used with a larger diameter wheel (e.g. 27 inch (in.)) to be used with a smaller diameter wheel (e.g. 26 in.) and a shorter suspension fork 13. The spacer 20 allows such a wheel-size change, without altering the relative geometry of the components of the frame 10, which allows for an improved functioning of the bicycle. The spacer 20 can take any suitable configuration to achieve such functionality, and be made of any suitable material, such as aluminum. The spacer 20 has a cup-like configuration, and includes a circumferential body 30 and a central bore 40 extending through the length of a center of the body 30, both of which will now be described in greater detail. In one particular embodiment, the body 30, and thus the entire spacer 20, is monolithic (i.e. it is composed of a single piece of material) which may be formed by machining, molding, casting, etc. In one possible embodiment, the spacer 20 is entirely made of aluminum.

The body 30 is an annular member which defines the corpus of the spacer 20 and provides its structure. It defines a center axis 32 which can be parallel to, and co-axial with, the drive or central axis of the head tube 12. The annular body 30 extends axially relative to the center axis 32, thus defining the length of the body 30, through which extends a central bore 40. Indeed, the length of the body 30 is defined between the following two surfaces: an upper spacer surface 34 and a lower spacer surface 36, both of which are generally annular. The length of the body 30 can vary depending on numerous factors such as the suspension fork 13 being used, the length of the head tube 12, and the diameter of the wheel. One possible dimension for the length of the body 30 is about 10 mm (approximately 0.3937 inches).

Figure 3:
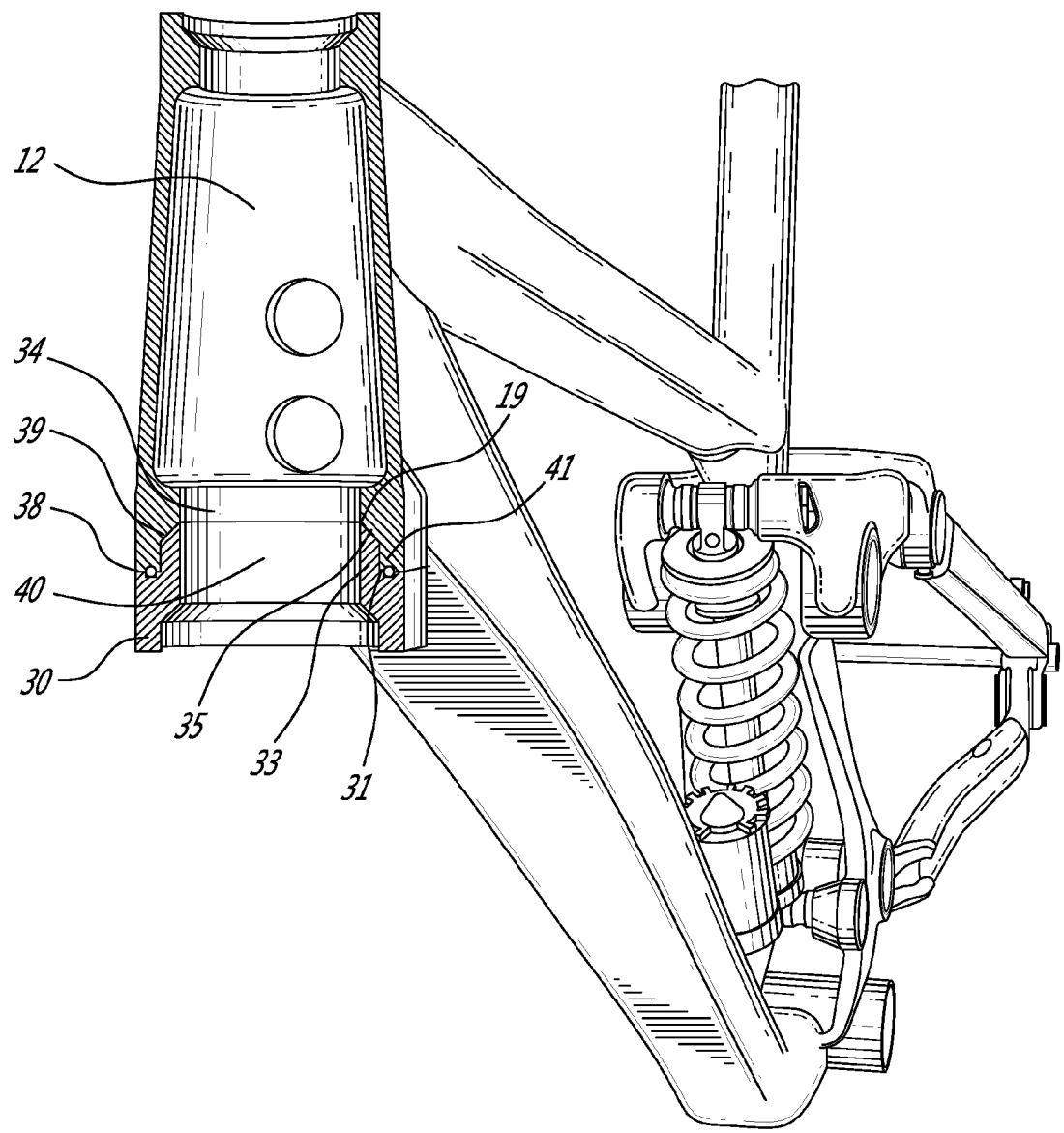
FIG. 3 is another perspective view of the spacer and head tube of FIG. 1.

Referring to FIG. 3, the upper spacer surface 34 (or simply "upper surface 34") is an upper area of the body 30 which mates and engages with the lower mating surface 19 of the head tube 12 when the spacer 20 is mounted to the heat tube 12. It is thus the interface between the spacer 20 and the head tube 12. The upper surface 34 has a profile which substantially matches the profile of the lower mating surface 19 of the head tube 12, which are complementary to each other so as to form a seal therebetween when the spacer is mounted to the head tube. The profile of the upper surface 34, and therefore of the interface, is defined by a radially outer planar rim 38 and an engagement flange 39 positioned adjacent to, and radially inwardly from, the planar rim 38. The engagement flange 39 extending axially upwardly from the surface of the planar rim 38. The planar rim 38 defines the outer radial boundary of the body 30 and mates with a correspondingly planar portion of the lower mating surface 19 of the head tube 12. The engagement flange 39 circumscribes the opening 40 and abuts against a correspondingly receded portion of the lower mating surface 19, thereby forming a stepped annular upper surface 34 and helping to strengthen the connection between the spacer 20 and the head tube 12.

In some embodiments, the upper rim 38 has an annular groove 31 extending about a circumference of the planar upper rim 38 into the body 30 from the upper surface 34. In one particular embodiment, the annular groove 31 is arcuate in transverse cross-sectional shape, and may define an at least partially circular cross-section. However, the size and configuration of the groove 31 can vary. The groove 31 receives therein a sealing element 41, such as an O-ring or other suitable seal. In so doing, the groove 31 in combination with the stepped shape of the annular upper surface 34 allows for a relatively watertight seal to be created between the spacer 20 and the head tube 12.

In the depicted embodiment, the engagement flange 39 has a flange body 33 which extends upwardly from the planar rim 38, and may be made of a suitable material such as aluminum. The flange body 33 is defined between an inner annular wall which circumscribes the opening 40 and an outer annular wall spaced radially outwardly from the inner wall. The inner wall extends from the surface of the upper rim 38 a length which is greater than the length at which the outer wall extends from the upper rim 38. At their extremities, the inner and outer walls connect to each other via a bevelled surface 35. The bevelled surface 35 may be sloped upwardly towards the center axis 32. In other words, the bevelled surface 35 is angled and faces away from the bore 40 such that an uppermost edge of the bevelled surface is radially inwardly and the lowermost edge of the bevelled surface is radially outwardly. Such a configuration of the engagement flange 39 can help the spacer 20 to better engage with the seat tube 12. Of course, any other suitable configuration is possible for the engagement flange 39 so as to match a corresponding recessed portion of the lower mating surface 19 of the seat tube 12.

Figure 4:
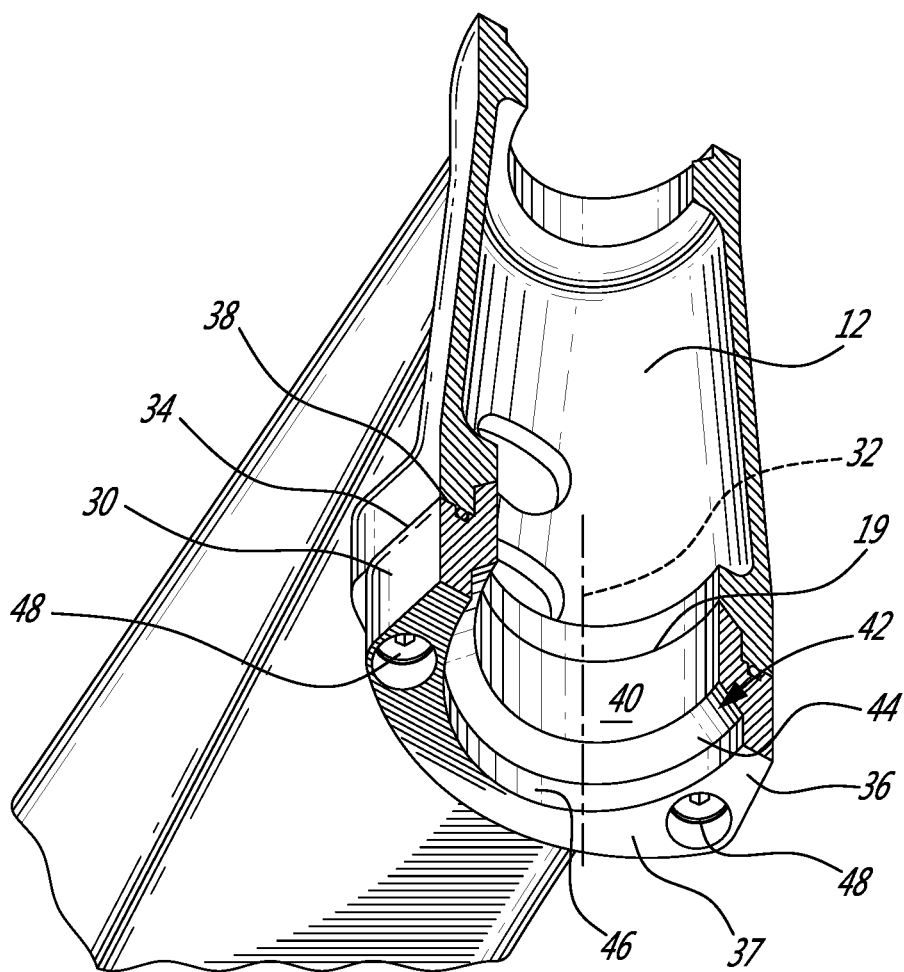
FIG. 4 is yet another perspective view of the spacer and head tube of FIG. 1.

Referring to FIG. 4, the lower spacer surface 36 (or simply "lower surface 36") is adapted to engage the central stem member 17 of the suspension fork 13, or any other direct or intermediary component thereof, such as a bearing. In so doing, the lower surface 36 can form a substantially watertight seal with the surface with which it engages. As such, the lower surface 36 can have a profile substantially matching the profile of the surface with which it will engage. The lower surface 36 has an annular planar lower rim 37 which is adapted to engage with a corresponding surface, and a lower engagement surface 42 which is recessed from the lower rim 37. The lower engagement surface 42 defines the boundary of the opening 40 at the lower end of the body 30. At a certain distance from the upper surface 34, the opening 40 flares radially outward or increases in diameter until it reaches the lower rim 37.

In some embodiments, this radially outward flaring of the opening can include a first tapered section 44 and an annular section 46. At the distance from the upper surface 34, the opening 40 extends from this first section 44 which tapers radially outwardly along a certain length until the annular section 46, and which has an inner diameter equal to an inner diameter of the lower rim 37. The length and slope of the first tapered section 44 can be equal to the length and slope of the bevelled edge 35. Such a configuration of the lower engagement surface 42 may be better adapted to receive and support a bearing or other component of the central stem member 17 of the suspension fork 13 by mimicking the contour of the existing bearing seat on the suspension fork 13. This may result in an improved sealed engagement between the spacer 20 and the suspension fork 13.

The dimensions and configurations of the upper and lower rims 38,37 can vary. Indeed, the inner diameter (i.e. the diameter of the rims 38,37 closest to the opening 40) and the outer diameter of the rims 38,37 can be constant, or can vary along their circumferences. For example, it may be desirable to increase the outer diameter of both rims 38,37 only along the arcuate portion behind the center axis 32 so that they are sufficiently wide to have one or more screw holes 48 extending parallel to the driving or center axis 32 from the lower rim 37 to the upper rim 38. Appropriately sized screws or other mechanical fasteners can be inserted through the screw holes 48 and into corresponding screw holes in the lower mating surface 19 of the head tube 12 to thereby fasten the spacer 20 to the head tube 12. Furthermore, the outer diameters of the rims 38,37 can be equal, or can be selected such that the upper and lower rims are coextensive (i.e. sharing the same limits or extent) with an outer surface of the head tube 12.

In light of the preceding, it can be appreciated that by positioning the spacer 20 in place as described above, the spacer 20 is a device which allows a bicycle with a frame designed for use with a larger diameter wheel (e.g. 27 in.), to be used with a smaller diameter wheel (e.g. 26 in.) and a corresponding shorter front suspension fork 13, while preserving the relative geometry of the frame 10 and its components. Indeed, the positioning of the spacer at a lower end of the head tube 12 may allow for a better maintenance of the relative geometry of the components of the bicycle, and particularly of its suspension. Furthermore, the spacer 20 can also be used to adjust the geometry of a bicycle frame, such as its head angle (i.e. the relative angle that the axis of the head tube 12 makes with the ground), by adding the space in place beneath the head tube even when no wheel size change is made.

Further advantageously, the sealed engagement of the spacer 20 with the head tube 12 and the suspension fork 13 can help to avoid contaminating the mating of the upper surface 34 and the lower mating surface 19 with moisture or debris, and further prevent such moisture or debris from entering the hollow head tube 12. In being located at the lower end of the head tube, the spacer 20 is at a greater risk of debris and moisture impacting the spacer 20 and its engagement with the head tube 12 and the suspension fork 13, when compared to a spacing device located at an upper end of the head tube and only mounted thereto. Such a sealed engagement can therefore be comparatively important.

In another aspect, there is provided a method for extending a length of a head tube of a bicycle adapted to be mounted to a front suspension fork. The method includes providing a spacer, such as the one described above, which has a body extending between an upper spacer surface and a lower spacer surface. The method also includes mating the upper surface with a correspondingly contoured lower mating surface of the head tube. The method also includes mating the lower surface with a correspondingly contoured component or feature of the front suspension fork, thereby placing the body between the head tube and the suspension fork and extending the length of the head tube.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A spacer for positioning between a head tube of a frame of a bicycle and a front wheel fork of the bicycle, the spacer comprising a body defining a center axis and extending axially between an upper spacer surface and a lower spacer surface, the body being annular and having a bore extending axially therethrough, concentrically with the center axis, between respective openings in the upper spacer surface and the lower spacer surface, each of the upper spacer surface and the lower spacer surface being annular, the upper spacer surface including a radially outer planar rim and an engagement flange disposed radially inwardly from the planar rim, the engagement flange projecting axially upwardly from the planar rim and circumscribing the opening in the upper spacer surface, the planar rim and the engagement flange abutting complementary surfaces on a lower mating surface of the head tube and forming a seal with the head tube upon being engaged therewith.

2. The spacer of claim 1, wherein the opening in the lower spacer surface is larger than the opening in the upper spacer surface.

3. The spacer of claim 2, wherein the bore increases in cross-sectional size, at a given distance away from the upper spacer surface toward the lower spacer surface.

4. The spacer of claim 3, wherein at said given distance from the upper spacer surface, the bore extends from a first portion tapering radially outwardly to an annular portion, the annular portion having an inner diameter equal to an inner diameter of the second opening.

5. The spacer of claim 4, wherein the engagement flange has flange body extending upwardly from the planar rim and terminating in a bevelled surface, and the first portion has an angular orientation substantially parallel to an orientation of the bevelled surface.

6. The spacer of claim 1, wherein an annular groove extends into the planar rim of the upper spacer surface, the annular groove receiving a sealing element therein.

7. The spacer of claim 6, wherein the annular groove is arcuate in transverse cross-sectional shape.

8. The spacer of claim 1, wherein the engagement flange has flange body extending upwardly from the planar rim and terminating in a bevelled surface.

9. The spacer of claim 8, wherein the bevelled surface is angled and faces away from the bore such that an uppermost edge of the bevelled surface is radially inwardly and the lowermost edge of the bevelled surface is radially outwardly.

10. The spacer of claim 1, wherein the lower spacer surface includes an annular planar rim, the annular planar rim of the lower spacer surface being parallel to and axially spaced apart from the annular planar rim of the upper spacer surface.

11. The spacer of claim 10, wherein the planar rims of the upper and lower spacer surfaces have equal inner and outer diameters.

12. The spacer of claim 1, wherein the planar rims of the upper and lower spacer surfaces are coextensive with an outer surface of the head tube.

13. The spacer of claim 1, wherein the bore is at least partially internally threaded.

14. The spacer of claim 1, wherein the spacer body is monolithic and made entirely of aluminum.

15. A front wheel kit for a bicycle, comprising:
a fork for a front wheel of the bicycle having two fork members adapted to receive an axle of the front wheel mounted to lower ends of the fork members, and upper ends of the fork members being attached to a central stem which is adapted to mate with a head tube of the bicycle; and
a spacer for positioning between the head tube and the fork, the spacer having a body defining a center axis and extending axially between an upper spacer surface and a lower spacer surface, the body being annular and having a bore extending axially therethrough, concentrically with the center axis, between respective openings a first opening in the upper spacer surface and the lower spacer surface, each of the upper spacer surface and the lower spacer surface being annular, the upper spacer surface including a radially outer planar rim and an engagement flange disposed radially inwardly from the planar rim, the engagement flange projecting axially upwardly from the planar rim and circumscribing the opening in the upper spacer surface, the planar rim and the engagement flange adapted to abut complementary surfaces on a lower mating surface of the head tube and forming a seal with the head tube upon being engaged therewith, the lower spacer surface of the spacer abutting a mating surface of the fork and the bore of the spacer receiving the central stem of the fork therein.

16. The front wheel kit of claim 15, wherein the opening in the lower spacer surface is larger than the opening in the upper spacer surface.

17. The front wheel kit of claim 16, wherein the bore increases in cross-sectional size, at a given distance away from the upper spacer surface toward the lower spacer surface.

18. The front wheel kit of claim 17, wherein at said given distance from the upper spacer surface, the bore extends from a first portion tapering radially outwardly to an annular portion, the annular portion having an inner diameter equal to an inner diameter of the opening in the lower spacer surface.

19. The front wheel kit of claim 16, wherein the engagement flange has flange body extending upwardly from the planar rim and terminating in a bevelled surface.

20. The front wheel kit of claim 19, wherein the bevelled surface is angled and faces away from the bore such that an uppermost edge of the bevelled surface is radially inwardly and the lowermost edge of the bevelled surface is radially outwardly.

21. The front wheel kit of claim 15, wherein the fork is a suspension fork.

22. A bicycle frame set including at least a main frame and the front wheel kit of claim 15.

* * * * *